(12) United States Patent
Arnaud et al.

(10) Patent No.: US 8,690,978 B2
(45) Date of Patent: Apr. 8, 2014

(54) LIQUID RESIN COMPOSITION FOR ABRASIVE ARTICLES

(71) Applicants: Saint-Gobain Abrasives, Inc, Worcester, MA (US); Saint-Gobain Abrasifs Technologie et Services S.A.S., Conflans Sainte Honorine (FR)

(72) Inventors: Alex Arnaud, Montrouge (FR); Philippe Espiard, Gouvieux (FR); Sandrine Pozzolo, Claye Souilly (FR)

(73) Assignees: Saint-Gobain Abrasives, Inc., Worcester, MA (US); Saint-Gobain Abrasifs Technologie et Services S.A.S., Conflans Sainte Honorine (FR)

( * ) Notice: Subject to any disclaimer, the term of this patent is extended or adjusted under 35 U.S.C. 154(b) by 0 days.

(21) Appl. No.: 13/711,107

(22) Filed: Dec. 11, 2012

(65) Prior Publication Data

US 2013/0091778 A1   Apr. 18, 2013

Related U.S. Application Data

(63) Continuation of application No. 12/681,252, filed as application No. PCT/FR2008/051779 on Oct. 1, 2008, now abandoned.

(30) Foreign Application Priority Data

Oct. 1, 2007   (FR) ...................... 07 06880

(51) Int. Cl.
| | | |
|---|---|---|
| *B24D 3/28* | (2006.01) |
| *B32B 27/04* | (2006.01) |
| *B32B 27/38* | (2006.01) |
| *C08G 59/22* | (2006.01) |
| *C08G 59/32* | (2006.01) |
| *C08G 59/68* | (2006.01) |
| *C09D 163/02* | (2006.01) |
| *C09D 163/04* | (2006.01) |

(52) U.S. Cl.
USPC ............. 51/298; 51/295; 51/297; 51/307; 51/308; 51/309; 428/323; 428/328; 428/329; 428/331; 523/456; 523/461

(58) Field of Classification Search
USPC .............. 51/295, 297, 298, 307, 308, 309; 523/400, 457, 456, 461; 428/323, 328, 428/329, 331, 413
See application file for complete search history.

(56) References Cited

U.S. PATENT DOCUMENTS

| | | | |
|---|---|---|---|
| 3,615,303 A | 10/1971 | Singer et al. | |
| 3,945,972 A | 3/1976 | Sakamoto | |
| 5,014,468 A | 5/1991 | Ravipati et al. | |
| 5,178,646 A | 1/1993 | Barber, Jr. et al. | |
| 5,441,549 A | 8/1995 | Helmin | |
| 5,730,764 A | 3/1998 | Williamson et al. | |
| 2010/0006998 A1 * | 1/2010 | Masuda et al. | 257/678 |
| 2010/0007018 A1 * | 1/2010 | Wyatt et al. | 257/737 |

FOREIGN PATENT DOCUMENTS

| | | | | |
|---|---|---|---|---|
| GB | 994 484 | 6/1965 | | |
| GB | 2 021 625 | 12/1979 | | |
| WO | WO 2008053590 A1 * | 5/2008 | | H01L 21/52 |
| WO | WO 2008069805 A1 * | 6/2008 | | H01L 21/60 |

* cited by examiner

*Primary Examiner* — Michael J Feely

(74) *Attorney, Agent, or Firm* — Oblon, Spivak, McClelland, Maier & Neustadt, L.L.P.

(57) ABSTRACT

The present invention relates to a thermally curable liquid resin composition capable of being used in the manufacture of abrasive articles, and to the resulting abrasive articles.

35 Claims, No Drawings

LIQUID RESIN COMPOSITION FOR ABRASIVE ARTICLES

This is a continuation application of U.S. Ser. No. 12/681,252, filed Jul. 9, 2010 (now abandoned), which is a national stage entry of PCT/FR08/51779, filed Oct. 1, 2008, which claims priority to FR 0706880, filed Oct. 1, 2007.

The present invention relates to a thermally curable liquid resin composition capable of being used in the manufacture of abrasive articles, and to the resulting abrasive articles.

Abrasive articles generally incorporate a multitude of abrasive grains firmly bound to a support or together by a binder. These articles are widely used for machining various materials, especially in cutting, grinding, deburring and polishing operations.

Conventionally, a distinction is made between coated abrasives and bonded abrasives.

Coated abrasives comprise a generally flexible support material, spread on the surface of which are abrasive grains set in a binder. The flexible support may be a sheet of paper, a film or a network of fibres, for example a mat, a felt, a woven or a knit of natural or synthetic fibres, especially made from glass or a polymer. These abrasives may adopt various forms: sheets, strips, discs, etc.

The manufacture of coated abrasives comprises the application of a make coat on the support material, the distribution of the abrasive grains on said coat, heat treatment of the make coat with a view to partially curing it and the application of a size coat which guarantees a firm anchoring of the grains on the support. A supersize coat may be deposited on the size coat and the abrasive grains.

The make, size and supersize coats are applied in liquid form. They are generally composed of a thermosetting resin, especially a resol type phenolic resin.

Bonded abrasives are composed of abrasive grains bound together by a binder which makes it possible to have a three-dimensional structure suitable for carrying out abrasion operations, especially cutting hard material such as steel. Generally, these abrasives have the appearance of a grinding wheel, a grinding wheel segment and a whetstone.

Bonded abrasives in the form of "conventional" grinding wheels are formed from a single region composed of abrasive grains embedded in the binder which extends from the bore to the periphery of the wheel. In "superabrasive" wheels the abrasion region is located at the periphery, in the form of a strip supported by a central core generally made of metal, and the abrasive grains are composed of a very hard material, for example diamond or cubic boron nitride.

Bonded abrasives are obtained by the process using cold or hot compression moulding techniques.

In cold compression moulding, which is the most widespread, the mixture of the abrasive constituents, in granular form, is introduced into a mould, then a sufficient compressive force is applied, of around 15 to 25 N/mm$^2$, to make said mixture into the shape of the mould and to ensure that, after extraction from the mould, the part obtained (green article) has sufficient strength in order to be able to be handled without losing its initial shape. The part is then heated in an oven at a temperature that allows the binder to be crosslinked, this temperature depending on the nature of the binder used.

Hot compression moulding makes it possible to achieve a higher level of compaction than cold moulding, which is expressed by a lower pore volume in the final article. In this process, the granular mixture introduced into the mould is compacted under pressure and simultaneously heated in order to enable the binder to spread out better between the abrasive grains and to occupy the empty spaces. After having been removed from the mould, the part generally undergoes a post-crosslinking heat treatment that aims to improve its operating lifetime and its abrasion performance.

Whatever type of compression moulding used, either cold or hot, it is essential that the mixture of the abrasive constituents is in granular form.

The preparation of the granular mixture is carried out by pretreating the abrasive grains with a liquid impregnation resin, in general a resol type phenolic resin, then by mixing the wet grains with a novolac type phenolic resin powder containing a crosslinking agent—powder which will subsequently form the binder itself—and if necessary additives, also in powder form. The mixture obtained is thus composed of abrasive grains, bonded to the surface of which are solid resin and additive particles. This mixture has a good ability to be uniformly distributed in the mould (referred to as "flowability") and to be shaped under the effect of pressure.

The resol type thermosetting resins used for manufacturing coated and bonded abrasives have many advantages under the intended usage conditions, especially:
  they provide a solid bond between the grains and the support material, on the one hand, and between the grains themselves, on the other hand;
  they withstand well the high mechanical stresses that occur under the peripheral high-speed grinding conditions, which makes it possible to prevent the tool from breaking; and
  their high thermal resistance makes it possible to limit the risk of excessive heat build-up within the tool.

One drawback of the aforementioned resols lies in the fact that they contain formaldehyde which is harmful to human health and to the environment.

It is known that resols contain free formaldehyde which may be emitted into the atmosphere during the manufacture of the abrasives, and that they can, in addition, generate formaldehyde under the usage conditions of the abrasive, when the temperature reaches a level that leads to the degradation of the resol with release of formaldehyde.

For several years now, the regulations regarding formaldehyde emissions have been getting stricter and tend to limit the amount of formaldehyde which is contained in abrasives or which may be emitted from these products.

Many resin compositions having a low formaldehyde content have been proposed.

Proposed in U.S. Pat. No. 6,133,403 are reactive diluents for phenolic compositions and crosslinkable novolacs intended for producing composite materials that have a high impact strength.

WO 2005/108454 A1 describes a novolac resin and non-formaldehyde hardener composition for reinforcing composites.

Described in U.S. Pat. No. 5,523,152 is a curable composition for abrasives that comprises an aminoplast resin and a reactive diluent which both contain unsaturated pendant groups.

U.S. Pat. No. 5,178,646 describes a binder precursor composition for abrasives, especially coated abrasives, which comprises a thermally curable resin having a plurality of pendant methylol groups and a reactive diluent having at least one functional group that reacts with the groups of the resin.

U.S. Pat. No. 5,549,719 describes a composition intended to form the base adhesive layer of coated abrasives. The composition comprises an aqueous dispersion of an epoxy resin, an emulsifier and a crosslinking agent, and if necessary an agent that aids the abrasion. This aqueous composition makes it possible to replace the compositions based on organic solvents whose use becomes more restrictive but in return makes it necessary to treat the abrasives in a steam plant in order to remove the water.

The present invention aims to reduce the amount of formaldehyde and water in an abrasive product.

For this purpose, the invention provides a thermally curable liquid resin composition which forms an alternative to the resols and to the aqueous epoxy resins used as an adhesive in coated abrasives and as an impregnation resin in bonded abrasives, this liquid resin composition being characterized in that it comprises at least one resin comprising at least two epoxy groups and at least one reactive diluent, and in that it has a viscosity, at 25° C., less than or equal to 7000 mPa·s.

Preferably, the liquid resin composition has a viscosity of less than or equal to 6000 mPa·s, measured at 25° C.

The epoxy resin may be chosen from any type of resin comprising at least two, preferably at most 10, epoxy functional groups. The expression "epoxy functional group" is understood to mean a group containing an oxirane ring.

Generally, the epoxy resin has an epoxide equivalent weight that varies from 160 to 700, preferably less than or equal to 500 and advantageously less than or equal to 350. The epoxide equivalent weight (EEW) is the ratio of the average molecular weight of the resin to the average number of epoxy functional groups per molecule.

According to a first embodiment of the invention, the epoxy resin is chosen from the epoxy resins of which the main chain is aliphatic, cycloaliphatic or aromatic. Preferably, the epoxy resin is an aromatic epoxy resin, advantageously of the bisphenol A or F type, in particular the bisphenol A or F diglycidyl ether of formula:

Preferably, the aldehyde/phenol molar ratio varies from 0.2 to less than 1, advantageously from 0.35 to 0.9 and better still from 0.5 to 0.9.

The novolac resin may be prepared by using a known acid catalyst, for example a strong mineral acid such as sulphuric acid, phosphoric acid and hydrochloric acid, or an organic acid such as oxalic acid, salicylic acid or anhydrides such as maleic anhydride. The amount of acid must be sufficient to allow the condensation of the phenolic compound and of the aldehyde. The amount of acid used generally represents from 0.02 to 1% of the weight of the starting phenolic compound, preferably 0.1 to 0.6% in the case of a strong mineral acid, and from 0.3 to 3% of the weight of the starting phenolic compound in the case of an organic acid.

Preferably, the novolac resin obtained at the end of the condensation reaction is treated so as to reduce the content of free phenolic compound, for example by vacuum distillation.

The preferred epoxidized novolacs correspond to the formula:

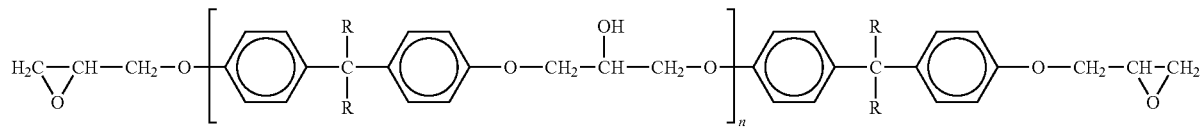

with: n=0-10, preferably 1-4, and R=H or $CH_3$, preferably $CH_3$.

The epoxy resins of bisphenol A or F type may be obtained by reacting a bisphenol A or F with an excess of epichlorohydrin, in the presence of a basic catalyst, for example sodium hydroxide, at a temperature of around 100° C.

According to a second embodiment, the epoxy resin is chosen from epoxidized novolac resins.

The epoxidized novolac resin may be obtained by treating a novolac resin with an excess of epichlorohydrin in the presence of a basic catalyst, for example sodium hydroxide, at a temperature of around 100° C.

The novolac resin may be chosen from the novolacs known to a person skilled in the art which are obtained by reaction of a phenolic compound and an aldehyde in an aldehyde/phenolic compound molar ratio of less than 1, in the presence of an acid catalyst.

The phenolic compound is chosen from phenol and substituted phenols such as cresols, guaiacol, methoxyphenols, catechol, resorcinol, tert-butylphenol and nonylphenol, bisphenols such as bisphenol A or F, naphthols and mixtures of these compounds. Preferably, phenol is chosen.

The aldehyde is chosen from alicyclic aldehydes such as formaldehyde, cyclic aldehydes such as furfural, aromatic aldehydes such as benzaldehyde, para-anisaldehyde, ortho-anisaldehyde and veratraldehyde, and mixtures of these aldehydes. Preferably, formaldehyde is chosen.

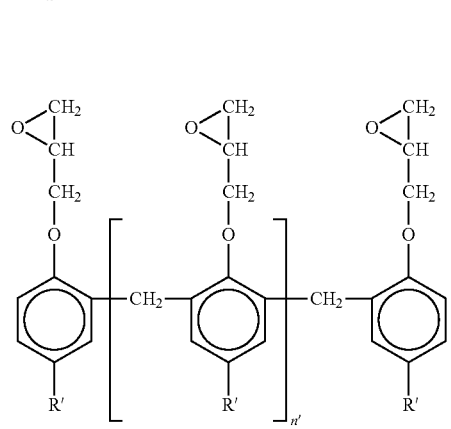

with R'=H or

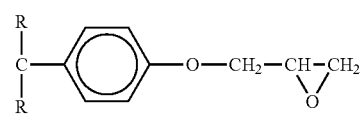

in which R=H or $CH_3$, preferably $CH_3$, and n'=0-4, preferably 0.1-2.

The novolacs that can be used within the scope of the invention contain less than 0.1% by weight of free formaldehyde, and preferably less than 0.05%. They advantageously have a low molecular weight, less than 3000 g/mol.

The epoxy resin may be composed of a mixture of at least one epoxidized aromatic resin and at least one epoxidized novolac resin described above.

The resin composition may also comprise at least one resin different from the epoxy resin according to the invention capable of reacting with said epoxy resin and/or the crosslinking agent as explained later on, for example a novolac. The proportion of epoxy resin must however remain greater than or equal to 50% by weight of all the resins, epoxy resin(s) and other resin(s), preferably greater than or equal to 75% and advantageously the proportion is equal to 100%.

The epoxy resin represents at least 30% by weight of the resin composition, preferably at least 40% and advantageously at least 50%, and does not exceed 90%.

The reactive diluent according to the invention is a compound which is liquid at room temperature, around 20 to 25° C., which makes it possible to dissolve the epoxy resin and to adjust the viscosity of the resin composition.

Preferably, the reactive diluent has a viscosity, measured at 25° C., less than or equal to 1000 mPa·s, preferably less than or equal to 700 mPa·s, advantageously less than 500 mPa·s and better still less than 350 mPa·s.

The reactive diluent also contains at least one functional group capable of reacting with the resin and/or the crosslinking agent, a functional group that is chosen from the hydroxy, aldehyde, epoxy, oxazolidine and lactone functional groups.

As examples of reactive diluents comprising hydroxy functional groups, mention may be made of saturated or unsaturated alicyclic alcohols, such as ethylene glycol, 1,3-butylene glycol, glycerol, trimethylolpropane and the monoallyl ethers of these compounds, saturated or unsaturated cyclic alcohols, such as furfuryl alcohol, mononuclear or polynuclear aromatic alcohols, such as benzyl alcohol and its derivatives, m-cresol, 3,5-xylenol, nonylphenol, cardanols and their derivatives such as cardols, methyl cardols and anacardic acids especially contained in cashew nut shells ("cashew nut shell liquid") denoted as CNSL), and naphthol, and the precursors of these alcohols, especially acetals and trioxanes.

As examples of reactive diluents comprising aldehyde functional groups, mention may be made of glyoxal.

As examples of reactive diluents comprising epoxy functional groups, mention may be made of glycidyl ethers of saturated or unsaturated alcohols such as 1,4-butanediol diglycidyl ether, 1,6-hexanediol diglycidyl ether, epoxidized fatty acids especially contained in epoxidized oils, in particular soybean oil (ECOCET®, from Arkema) and linseed oil (VIKOFLEX®, from Arkema), aromatic epoxies such as epoxidized cardanols, especially 3-n-pentadecadienylphenol.

As examples of reactive diluents comprising oxazolidine functional groups, mention may be made of 3-ethyl-2-methyl (3-methylbutyl)-1,3-oxazolidine, 1-aza-3,7-dioxa(5-ethyl) bicyclo[3.3.0]octane and bisoxazolidines.

The preferred reactive diluent comprising a lactone functional group is gamma-butyrolactone. Advantageously, gamma-butyrolactone is used in admixture with triphenylphosphite, which permits to improve the thermal behaviour of the liquid resin composition.

The preferred diluents are furfuryl alcohol, cardols and derivatives thereof (CNSL), glyoxal, 1,4-butanediol diglycidyl ether, 1,6-hexanediol diglycidyl ether, epoxidized cardanols, bisoaxazolidines and gamma-butyrolactone.

The reactive diluent represents at least 10% by weight of the resin composition, preferably at least 20%, and advantageously does not exceed 70%, preferably 30%. Below 10%, the viscosity of the resin composition is too high for it to be used in the targeted applications. Above 70%, the mechanical properties of the final abrasive product are not satisfactory.

The resin composition may comprise, in addition, at least one crosslinking agent and/or at least one crosslinking catalyst.

The crosslinking agent must have a high reactivity with regards to the epoxy resin and/or the reactive diluent.

The crosslinking agent is chosen from compounds incorporating at least one amine, hydroxy, aldehyde or carboxylic functional group, and heterocyclic compounds that have a structure incorporating a nitrogen atom and an oxygen atom separated by a carbon atom.

As examples of compounds incorporating at least one amine functional group, mention may be made of aliphatic amines such as triethylenetetramine (TETA) and triethylenepentamine (TEPA), polyamidoamines and aromatic polyamines such as diaminodiphenylmethane (MDA) and diaminodiphenyl sulphone (DDS).

As examples of compounds that incorporate at least one hydroxy functional group, mention may be made of tris(hydroxymethyl)nitromethane and resins comprising condensates obtained by Mannich reaction of a phenolic compound, an aldehyde and an amino alcohol as especially described in WO 2004/011519 A1, in particular phenol-formaldehyde-diethanolamine resins.

As examples of compounds incorporating at least one aldehyde functional group, mention may be made of glyoxal and its derivatives, and 2,2-dimethoxyethanal.

As examples of compounds incorporating at least one carboxylic functional group, mention may be made of acrylic acid homopolymers and copolymers.

As examples of heterocyclic compounds incorporating a nitrogen atom and an oxygen atom separated by a carbon atom, mention may be made of oxazolines such as 1,3-phenylenebisoxazoline and oxazolidines such as 3-ethyl-2-methyl-2-(3-methylbutyl)-1,3-oxazolidine and 1-aza-3,7-dioxa (5-ethyl)bicyclo[3.3.0]octane.

The preferred crosslinking agent is tris(hydroxymethyl) nitromethane, glyoxal and its derivatives, 2,2-dimethoxyethanal, resins containing condensates obtained by Mannich reaction of a phenolic compound, an aldehyde and an amino alcohol, acrylic acid homopolymers, 1,3-phenylenebisoxazoline, 3-ethyl-2-methyl-2-(3-methylbutyl)-1,3-oxazolidine and 1-aza-3,7-dioxa(5-ethyl)bicyclo[3.3.0]octane.

The crosslinking agent does not exceed 50% of the weight of the liquid resin composition and preferably does not exceed 30%.

The liquid resin composition may also comprise at least one crosslinking catalyst chosen from Lewis bases such as O-(dimethylaminoethyl)phenol, tris(dimethyl-aminoethyl) phenol, 2,4,6-tri(dimethylaminomethyl)-phenol, 2-methylimidazole, 2-ethyl-4-methylimidazole and 1-benzyl-2-methylimidazole, and Lewis acids such as the boron trifluoride-monoethyleneamine complex.

The preferred catalyst is 2,4,6-tri(dimethylaminomethyl)-phenol, 2-methylimidazole and 2-ethyl-4-methylimidazole.

The amount of catalyst in the liquid resin composition is less than or equal to 10 parts by weight per 100 parts by weight of epoxy resin, reactive diluent and, if necessary, crosslinking agent, and preferably is less than or equal to 5 parts.

Preparation of the liquid resin composition may be carried out by simple mixing of the constituents in a suitable vessel, advantageously equipped with stirring means; preferably, the novolac resin is introduced into the reactive diluent, then, if necessary, the crosslinking agent and/or the catalyst are added.

The constituents may be mixed at room temperature, around 20 to 25° C., or at a higher temperature, but which must remain at least 20° C. below the crosslinking temperature of the resin composition.

The viscosity of the liquid resin composition depends on the targeted application but remains less than or equal to 7000 mPa·s.

According to a first variant embodiment of the invention, the liquid resin composition according to the invention is used to manufacture bonded abrasives.

The liquid resin composition is first mixed with abrasive grains in a conventional mechanical mixer until the grains are suitably "wetted", that is to say are coated with the resin composition, then the powdered binder and the additives, also powdered, are added until a homogeneous granular mixture is obtained.

Preferably, the liquid resin composition has a viscosity at most equal to 3000 mPa·s, and advantageously greater than or equal to 600 mPa·s, at 25° C.

The crosslinking start temperature of the resin in the granular mixture is at most equal to 245° C., and advantageously at most equal to 195° C.

The time required to obtain complete crosslinking of the resin composition in the granular mixture is less than or equal to 36 hours, preferably less than or equal to 20 hours.

The abrasive grains may be any type of known abrasive grains, for example made of alumina, including therein fused aluminas and sintered aluminas obtained by the sol-gel process, which may or may not be seeded by a material of the same crystalline nature, and which may or may not be chemically modified, of iron oxide, molybdenum oxide, vanadium oxide, alumina-zirconia, boron-alumina, silicon carbide, aluminium oxynitride, diamond or cubic boron nitride, and mixtures of such grains. Preferably, the abrasive grains are made of alumina.

Preferably, the abrasive grains are pretreated with an organic compound that improves the adhesion between the grain and the liquid resin composition, chosen from compounds that contain silicon, for example a silane functionalized by organic groups such as a vinylsilane, especially vinyltriethoxysilane, an aminosilane, especially γ-aminopropyltrimethoxysilane, γ-aminopropyltriethoxysilane and diaminopropyl-ethoxysilane, or an epoxysilane. Preferably, γ-aminopropyltriethoxysilane is used.

The abrasive grains may be treated with the organic compound that contains silicon by, for example, spraying a solution of said compound in a suitable solvent or by dispersing the grains in the aforementioned solution. The treated abrasive grains are dried before being mixed with the liquid resin composition.

If necessary, it is possible to add to the abrasive grain and resin composition mixture, an organic liquid medium which helps to wet the grains and to form a uniform grain network, and which is subsequently removed during the crosslinking step. The organic medium may be water, an aliphatic alcohol, a glycol, high molecular weight petroleum fractions of oily or waxy consistency, a mineral oil or any other known medium.

The binder may be a phenol-aldehyde, melamine-aldehyde, urea-aldehyde, polyester, polyimide, epoxy, polyurethane or polybenzimidazole resin. Preferably, the binder is a resin having a low level of formaldehyde, advantageously a phenol-aldehyde resin of novolac type, and better still a phenol-formaldehyde novolac resin.

The additives are, for example, fillers, crosslinking agents and other compounds used for manufacturing bonded abrasives, especially those bonded by an organic resin.

The fillers are generally in the form of a finely divided powder comprising particles which may have the appearance, in particular, of granules, spheres or fibres. As examples, mention may be made of sand, silicon carbide, hollow alumina spheres, bauxite, chromites, magnesite, dolomites, hollow mullite spheres, borides, fumed silica, titanium dioxide, carbon-based products (carbon black, coke, graphite, etc.), wood flour, clay, talc, hexagonal boron nitride, molybdenum disulphide, feldspar, nepheline syenite and glass, in particular in the form of solid, cellular or hollow beads, and fibres. Generally, fillers represent 0.1 to 30% by weight of the granular mixture.

Crosslinking agents are used when the powdered binder is a novolac resin. They may be chosen from the compounds known for providing the aforementioned function such as hexamethylenetetramine or precursors thereof. The crosslinking agent is added in an amount of 5 to 20 parts by weight per 100 parts by weight of powdered novolac resin.

The additives may also comprise agents which help in carrying out the process, for example antistatic agents and lubricants. The amount of these additives may be easily determined by a person skilled in the art.

Preferably, the granular mixture is subjected to a curing treatment at ambient temperature for a duration of around 12 hours.

The granular mixture is then introduced into a mould equipped with compression means that makes it possible to form a green article that has sufficient cohesion to be able to be handled and treated in the following steps without a substantial change in its shape. At this stage the binder is in the non-crosslinked state.

The green article is then heated at a sufficient temperature so that the binder may crosslink and give a rigid polymer network that imparts to the article its final shape. Crosslinking is carried out according to a conventional curing cycle that consists in bringing the green article to a temperature of around 100° C. and in keeping it at this temperature for 30 minutes to several hours so that the volatile products formed can be discharged. Next, the article is heated at the final temperature for a duration that generally varies from 10 to 36 hours.

The final crosslinking temperature especially depends on the nature of the resin used, on the size and shape of the part to be treated and also on the curing duration. In general, the final crosslinking temperature is between 100 and 200° C.

Thermal crosslinking is carried out in a controlled atmosphere, preferably with a maximum degree of relative humidity.

The bonded abrasives obtained may be in the form of grinding wheels, grinding wheel segments, discs and whetstones.

According to a second variant embodiment of the invention, the liquid resin composition according to the invention is used to manufacture coated abrasives.

As already indicated, the manufacture of coated abrasives comprises the steps that consist in depositing a make coat on a support material, in spreading the abrasive grains on said coat, subjecting said material to a heat treatment that makes it possible to partially crosslink the resin composition, depositing a size coat and subjecting the coated material to a heat treatment so as to obtain the complete crosslinking of the resin composition. If necessary, a supersize coat may be deposited on the size coat and crosslinked by a suitable heat treatment.

The support material generally has a moderate to high flexibility, and has the appearance of a sheet, especially of paper, a film, especially a polymer film, or a more or less dense network of natural or synthetic fibres, for example glass fibres and vulcanized fibres.

The abrasive grains may be chosen from the grains already mentioned that are incorporated into the composition of bonded abrasives.

The application of the grains onto the make coat may be carried out by the usual techniques that operate by gravity or by an electrostatic route. The density of the abrasive grains on the support is chosen as a function of the desired application.

The liquid resin composition according to the invention may be used to form the make coat, the size coat or the supersize coat. Preferably, the liquid resin composition is used to form the make coat and the size coat, and where necessary the supersize coat.

Preferably, the liquid resin composition has a viscosity less than or equal to 6000 mPa·s and a crosslinking start temperature at most equal to 150° C., advantageously at most equal to 120° C. It advantageously contains at least one crosslinking agent or at least one crosslinking catalyst.

The time required to obtain complete crosslinking of the resin composition is less than 36 hours, preferably less than 20 hours.

The make, size and supersize coats which are not formed from the liquid resin composition according to the invention may be chosen from phenolic, urea-formaldehyde, epoxy, urethane, acrylic, aminoplast and melamine resins, and mixtures of these resins. Preferably, the resin or resin mixture has the lowest possible level of free formaldehyde.

The liquid resin composition may comprise, in addition, additives, for example wetting agents, fillers, coupling agents, dyes, pigments and antistatic agents.

When the liquid resin composition is used to form the size coat and/or the supersize coat, it advantageously comprises at least one agent that strengthens the abrasive performance of the final abrasive. Such an agent may be chosen from waxes, organic halogenated compounds, halogen salts, metals and metal alloys.

The heat treatment of the support material coated with the liquid resin composition forming the make coat is carried out at a temperature less than or equal to 150° C., preferably less than or equal to 120° C. for 1 to 120 minutes, preferably 1 to 60 minutes.

The heat treatment conditions for crosslinking the resin composition forming the size coat or supersize coat may be carried out at a temperature less than or equal to 150° C., preferably less than or equal to 120° C. for at most 36 hours, preferably at most 20 hours.

The examples given below make it possible to illustrate the invention without however limiting it.

In the examples, the properties of the liquid resin compositions are measured under the following conditions:
the crosslinking start temperature is measured by dynamic mechanical analysis (DMA): the liquid resin composition is introduced between two glass plates and the assembly is positioned horizontally in a device comprising two lower jaws fixed at a distance of 40 mm apart and an upper jaw applied against the upper sheet located at 20 mm from each of the preceding jaws. A force of 80 mPa is applied to the upper jaw with an oscillation frequency of 1 Hz, while heating the assembly from 25 to 300° C. at the rate of 4° C./minute. The elastic modulus of the resin composition is measured as a function of the temperature and the crosslinking start temperature is determined from the established curve.

the weight loss at 400° C. is determined by thermogravimetric analysis (TGA): the liquid resin composition is deposited in an aluminium pan and heated according to a given temperature cycle. 10 to 20 mg of the crosslinked resin composition are placed in an alumina crucible which is put into a machine continuously measuring the weight loss during a temperature cycle ranging from 25 to 700° C. at the rate of 10° C./minute. The weight loss at 400° C. is determined from the recorded curve.

EXAMPLES 1 TO 24 a) Liquid resin compositions having the composition given in Table 1 (in parts by weight) were prepared.

The resins were obtained by dissolving the epoxy resin in the reactive diluent, with moderate stirring, then by adding, if necessary, the crosslinking agent and/or the catalyst while maintaining the stirring conditions.

The resin was dissolved at ambient temperature, around 20 to 25° C. for the BADGE (epoxidized bisphenol A type resin) and at a temperature of around 50° C. for the epoxidized novolac resin.

The liquid resin compositions (Examples 1 to 24), and also the reference compositions (Ref. 1 to 3) were treated according to the following temperature cycles:
Cycle No. 1 (coated abrasives)
hold at 70° C. for 35 minutes;
70 to 80° C. in 5 minutes;
hold at 80° C. for 50 minutes;
80 to 90° C. in 5 minutes;
hold at 90° C. for 50 minutes;
90 to 100° C. in 5 minutes;
hold at 100° C. for 42 minutes;
100 to 115° C. in 5 minutes; and
hold at 115° C. for 42 minutes.
Cycle No. 2 (bonded abrasives)
cycle No. 1; and
200° C. for 2 hours.

The reference compositions 1 and 2 (Ref. 1 and 2) were liquid compositions suitable for producing coated abrasives based on a phenol-formaldehyde resol and a urea-formaldehyde resin respectively. The reference composition 3 (Ref. 3) was a liquid composition based on a phenol-formaldehyde resol which was suitable for manufacturing bonded abrasives.

The crosslinking start temperature and the weight loss at 400° C. for the resin compositions are given in Table 1.

b) The liquid resin compositions of Examples 8 and 22, and of the reference 3 were used to form mixtures with a solid novolac resin[12] suitable for manufacturing bonded abrasives. The mixtures comprised (in weight %): 12.7% of the liquid resin composition and 87.3% of the solid resin.

The weight loss at 400 and 500° C. was determined for the mixtures treated under the thermal conditions of cycle No. 2.

| Liquid resin composition | Weight loss (%) | |
|---|---|---|
| | 400° C. | 500° C. |
| Ex. 8 | 3.8 | 39.7 |
| Ex. 22 | 4.9 | 32.2 |
| Ref. 3 | 5.4 | 39.7 |

EXAMPLES 25 TO 39

Liquid resin compositions having the composition (in parts by weight) given in Table 2 were prepared in the conditions of examples 1 to 24.

The resins were obtained by dissolving the epoxy resin in the reactive diluent, with moderate stirring, then adding, if necessary, the catalyst while maintaining the stirring conditions.

The resin was dissolved at a temperature of around 35 to 50° C.

The liquid resin compositions are treated according to the temperature cycles 1 and 2 disclosed in examples 1 to 24.

The crosslinking start temperature and the weight loss at 400° C. for the resin compositions are given in Table 2.

(1) Sold under the reference EPIKOTE® 828 by Hexion Specialty Chemicals; bisphenol A diglycidyl ether (BADGE) resin; EEW: 184-190.
(2) Sold under the reference EPIKOTE® 600 by Hexion Specialty Chemicals; epoxidized phenol-novolac resin; EEW: 180-200.
(3) Sold under the reference HELOXY® MODIFIER BD by Hexion.
(4) Sold under the reference NC513 by Cardolite Europe.
(5) Sold under the reference Cashew Nut Shell Liquid (CNSL) by Palmer Ltd.; Cardanol content (>60 wt %).
(6) Sold under the reference HELOXY® MODIFIER HD by Hexion.
(7) Sold under the reference ZOLDINE® MS PLUS by Angus Dow.
(8) Sold under the reference INCOZOL® LV by Incorez.
(9) Sold under the reference ACUSOL® 445 by Rohm & Haas; average molecular weight: 4500.
(10) Resin based on phenol-formaldehyde-amino alcohol condensates according to Example 2(a) of WO 2004/011519 A1, modified in that the amino alcohol is diethanolamine.
(11) Sold under the reference HIGHLINK® CDO by Clariant; 60% solution in water.
(12) Sold under the reference BAKELITE® 8686 by Hexion Specialty Chemicals; contains 7 wt % of hexamethylenetetramine (HEXA).
(13) Sold under the reference BAKELITE® PF8505F by Hexion Specialty Chemicals.

TABLE 1

| Ex. | Resin (R) | Reactive diluent (RD) | Crosslinking agent (CA) | Catalyst (C) | R/RD/CA/C (parts by weight) | Crosslinking start temperature (° C.) | Weight loss at 400° C. after cycle 1 (%) | Weight loss at 400° after cycle 2 (%) |
|---|---|---|---|---|---|---|---|---|
| 1 | BADGE[1] | furfuryl alcohol | — | 2MI | 90/10/0/2 | 84 | 9.4 | n.d. |
| 2 | BADGE[1] | 1,4-butanediol diglycidyl ether[3] | — | 2MI | 90/10/0/2 | 90 | n.d. | 20.4 |
| 3 | BADGE[1] | 1,6-hexanediol diglycidyl ether[6] | — | 2MI | 90/10/0/2 | 99 | n.d. | 31.3 |
| 4 | BADGE[1] | epoxidized cardanols[4] | — | 2MI | 90/10/0/2 | 93 | n.d. | 12.9 |
| 5 | BADGE[1] | CNSL[5] | — | 2MI | 90/10/0/2 | 93 | 12.7 | n.d. |
| 6 | BADGE[1] | glyoxal | — | 2MI | 90/10/0/2 | 132 | 49.9 | n.d. |
| 7 | BADGE[1] | bisoxazolidine[8] | — | 2MI | 90/10/0/2 | n.d. | n.d. | 18.8 |
| 8 | epoxidized novolac[2] | Furfuryl alcohol | — | 2MI | 70/30/0/2 | n.d. | 16.0 | n.d. |
| 9 | epoxidized novolac[2] | Furfuryl alcohol | 3-ethyl-2-methyl(3-methylbutyl)-1,3-oxazolidine[7] | — | 50/20/30/0 | 250 | n.d. | 33.4 |
| 10 | epoxidized novolac[2] | Furfuryl alcohol | 1,3-PBO | — | 50/20/30/0 | 183 | n.d. | 19.3 | n.d.: not determined; 2MI: 2-methylimidazole; 1,3-PBO: 1,3-phenylenebisoxazoline

| 11 | epoxidized novolac[2] | furfuryl alcohol | TNE | — | 50/20/30/0 | 195 | n.d. | 20.0 |
| 12 | epoxidized novolac[2] | furfuryl alcohol | 1-aza-3,7-dioxa(5-ethyl)bicyclo[3.3.0]octane | — | 50/20/30/0 | 226 | n.d. | 16.5 |
| 13 | epoxidized novolac[2] | furfuryl alcohol | glyoxal | — | 50/20/30/0 | 136 | n.d. | 31.3 |
| 14 | epoxidized novolac[2] | furfuryl alcohol | acrylic polymer[9] | — | 50/20/30/0 | 244 | n.d. | n.d. |
| 15 | epoxidized novolac[2] | furfuryl alcohol | P-F-DEA resin[10] | — | 50/20/30/0 | 133 | n.d. | 21.7 |
| 16 | epoxidized novolac[2] | furfuryl alcohol | 2,2-dimethoxyethanal | — | 50/20/30/0 | 214 | n.d. | 20.6 |
| 17 | epoxidized novolac[2] | furfuryl alcohol | acrylic polymer[9] | 2MI | 50/20/30/2 | 144 | n.d. | n.d. |
| 18 | epoxidized novolac[2] | furfuryl alcohol | glyoxal derivative[11] | — | 50/20/30/0 | n.d. | n.d. | 49.5 | n.d.: not determined; 2MI: 2-methylimidazole; TNE: tris(hydroxymethyl)nitromethane; P-F-DEA resin: phenol-formaldehyde-diethanolamine resin

| 19 | epoxidized novolac[2] | 1,6-hexanediol diglycidyl ether[6] | — | 2MI | 70/30/0/2 | 155 | n.d. | 26.1 |
| 20 | epoxidized novolac[2] | 1,4-butanediol diglycidyl ether[3] | — | 2MI | 70/30/0/2 | 195 | n.d. | 30.3 |
| 21 | epoxidized novolac[2] | epoxidized cardanols[4] | — | 2MI | 70/30/0/2 | 225 | n.d. | 19.5 |
| 22 | epoxidized novolac[2] | CNSL[5] | — | 2M1 | 70/30/0/2 | 129 | 5.6 | n.d. |

TABLE 1-continued

| Ex. | Resin (R) | Reactive diluent (RD) | Crosslinking agent (CA) | Catalyst (C) | R/RD/CA/C (parts by weight) | Crosslinking start temperature (° C.) | Weight loss at 400° C. after cycle 1 (%) | Weight loss at 400° after cycle 2 (%) |
|---|---|---|---|---|---|---|---|---|
| 23 | epoxidized novolac[(2)] | glyoxal | — | 2MI | 70/30/0/2 | n.d. | 36.8 | n.d. |
| 24 | epoxidized novolac[(2)] | bisoxazolidine[(8)] | — | 2MI | 70/30/0/2 | n.d. | n.d. | 15.8 |
| Ref. 1 | PF resol | — | — | — | 100/0/0/0 | 125 | 14.1 | 11.3 |
| Ref. 2 | UF resin | — | — | — | 100/0/0/0 | 119 | 74.3 | n.d. |
| Ref. 3 | PF resol | — | — | — | 100/0/0/0 | 133 | n.d. | 8.9 | n.d.: not determined; 2MI: 2-methylimidazole; PF resol: phenol-formaldehyde resol; UF resin: urea-formaldehyde resin

TABLE 2

| Ex. | Resin (parts by weight) | Reactive diluent | Catalyst | Resin/reactive diluent/catalyst (parts by weight) | Cross-linking start temperature (° C.) | Weight loss at 400° C. after cycle 1 (%) | Weight loss at 400° after cycle 2 (%) |
|---|---|---|---|---|---|---|---|
| 25 | epoxidized novolac[(2)] | γ-butyrolactone | 2,4,6-tri-(dimethylamino-methyl)-phénol | 70/30/2 | 106 | n. d. | n. d. |
| 26 | epoxidized novolac[(2)]/novolac[(13)] 35/35 | γ-butyrolactone | 2,4,6-tri-(dimethylamino-methyl)-phénol | 70/30/2 | 110 | 30 | 8 |
| 27 | epoxidized novolac[(2)]/novolac[(13)] 35/35 | γ-butyrolactone/triphenylphosphite 30/70 | 2,4,6-tri-(dimethylamino-methyl)-phénol | 70/30/2 | n. d. | 32 | 17 |
| 28 | epoxidized novolac[(2)]/novolac[(13)] 35/35 | γ-butyrolactone/triphenylphosphite 30/70 | — | 70/30/2 | n. d. | 26 | 16 |
| 29 | epoxidized novolac[(2)]/novolac[(13)] 35/35 | γ-butyrolactone/triphenylphosphite 70/30 | 2,4,6-tri-(dimethylamino-methyl)-phénol | 70/30/2 | n. d. | 34 | 29 |
| 30 | epoxidized novolac[(2)]/novolac[(13)] 35/35 | γ-butyrolactone/triphenylphosphite 70/30 | 2MI | 70/30/2 | 112 | 37 | 24 |
| 31 | epoxidized novolac[(2)]/novolac[(13)] 35/35 | furfuryl alcohol | 2MI | 70/30/2 | 116 | 21 | n. d. |
| 32 | epoxidized novolac[(2)]/novolac[(13)] 35/35 | furfuryl alcohol/γ-butyrolactone 70/30 | 2,4,6-tri-(dimethylamino-methyl)-phénol | 70/30/2 | 115 | 24 | 6 |
| 33 | BADGE[(1)] | γ-butyrolactone | 2MI | 90/10/2 | 102 | 12 | 9 |
| 34 | BADGE[(1)] | γ-butyrolactone | 2-ethyl-4-methylimidazole | 90/10/2 | 115 | 8 | 7 |
| 35 | BADGE[(1)]/novolac[(13)] 70/20 | γ-butyrolactone | 2MI | 90/10/2 | 111 | 20 | 9 |
| 36 | BADGE[(1)]/novolac[(13)] 50/30 | γ-butyrolactone | 2MI | 80/20/2 | 115 | 20 | 13 |
| 37 | BADGE[(1)]/novolac[(13)] 35/35 | γ-butyrolactone/triphenylphosphite 30/70 | 2,4,6-tri-(dimethylamino-methyl)-phénol | 70/30/2 | n. d. | 46 | 39 |
| 38 | BADGE[(1)]/novolac[(13)] 50/30 | furfuryl alcohol | 2MI | 80/20/2 | 116 | 20 | 8 |
| 39 | BADGE[(1)]/novolac[(13)] 70/20 | furfuryl alcohol | 2MI | 90/10/2 | 107 | 20 | 11 | n. d.: not determined ; 2MI : 2-methylimidazole

The invention claimed is:

1. An abrasive article, comprising abrasive grains connected by a binder that is a product of crosslinking a thermally curable liquid resin composition suitable for manufacturing abrasives, comprising at least one resin comprising at least two epoxy groups;

at least one reactive diluent selected from the group consisting of furfuryl alcohol, cardol, a cardol derivative, epoxydized cardanol, bioxazolidines, and gamma-butyrollactone; and at least one crosslinking catalyst selected from the group consisting of 2-methylimidazole, 2-ethyl-4-methylimidazole, and 1-benzyl-2-methylimidazole, wherein the composition has a viscosity, at 25° C., less than or equal to 7000 mPa·s.

2. The abrasive article according to claim 1, wherein the abrasive grains are alumina grains, fused alumina grains, sintered alumina grains obtained by a sol-gel process, alumina grains which are seeded by a material of the same crystalline nature, alumina grains that are chemically modified, iron oxide, molybdenum oxide, vanadium oxide, alumina-zirconia, boron-alumina, silicon carbide, aluminium oxynitride, diamond, cubic boron nitride, or mixtures thereof.

3. The abrasive article according to claim 2, wherein the abrasive grains are treated with an organic compound that contains silicon.

4. The abrasive article according to claim 3, wherein the organic compound that contains silicon is a vinylsilane, an aminosilane, or an epoxysilane.

5. The abrasive article according to claim 4, wherein the organic compound that contains silicon is vinyltriethoxysilane, γ-aminopropyltrimethoxysilane, γ-aminopropyltriethoxysilane, or diaminopropyl-ethoxysilane.

6. The abrasive article according to claim 2, which is a bonded abrasive.

7. The abrasive article according to claim 2, which is a coated abrasive.

8. The abrasive article according to claim 1, wherein the at least one resin comprising at least two epoxy groups represents at least 40% by weight of the composition and does not exceed 90%.

9. A thermally curable liquid resin composition suitable for manufacturing abrasives, comprising
at least one resin comprising at least two epoxy groups;
at least one reactive diluent selected from the group consisting of furfuryl alcohol, cardol, a cardol derivative, epoxydized cardanol, bioxazolidines, and gamma-butyrollactone; and
at least one crosslinking catalyst selected from the group consisting of 2-methylimidazole, 2-ethyl-4-methylimidazole, and 1-benzyl-2-methylimidazole,
wherein the composition has a viscosity, at 25° C., less than or equal to 7000 mPa·s,
wherein the at least one resin comprising at least two epoxy groups represents at least 40% by weight of the composition and does not exceed 90%.

10. The composition according to claim 9, which has a viscosity less than or equal to 6000 mPa·s.

11. The composition according to claim 10, wherein the at least one resin comprising at least two epoxy groups has an epoxide equivalent weight of less than or equal to 500.

12. The composition according to claim 11, wherein the at least one resin comprising at least two epoxy groups has an epoxide equivalent weight of less than or equal to 350.

13. The composition according to claim 9, wherein the at least one resin comprising at least two epoxy groups has an epoxide equivalent weight that varies from 160 to 700.

14. The composition according to claim 9, wherein the at least one resin comprising at least two epoxy groups is comprises a main chain that is aliphatic, cycloaliphatic or aromatic.

15. The composition according to claim 14, wherein the at least one resin comprising at least two epoxy groups is an aromatic bisphenol A resin or F type resin.

16. The composition according to claim 15, wherein the at least one resin comprising at least two epoxy group is a bisphenol A or F diglycidyl ether of formula:

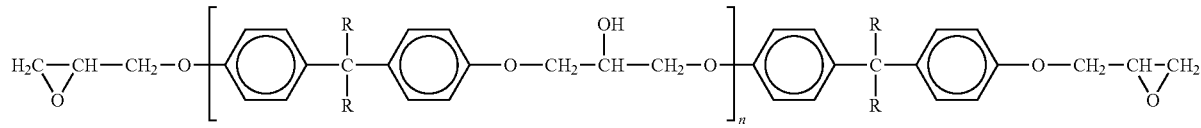

wherein n=0-10 and R=H or CH₃.

17. The composition according to claim 16, wherein n is 1-4 and R is CH₃.

18. The composition according to claim 9, wherein the at least one resin comprising at least two epoxy groups is an epoxidized novolac resin.

19. The composition according to claim 18, wherein the epoxidized novolac resin is obtained by reacting a phenolic compound and an aldehyde in an aldehyde/phenol molar ratio which varies from 0.2 to less than 1.

20. The composition according to claim 19, wherein the aldehyde/phenol molar ratio varies from 0.35 to 0.9.

21. The composition according to claim 20, wherein the aldehyde/phenol molar ratio varies from 0.5 to 0.9.

22. The composition according to claim 18, wherein the epoxidized novolac resin corresponds to the formula:

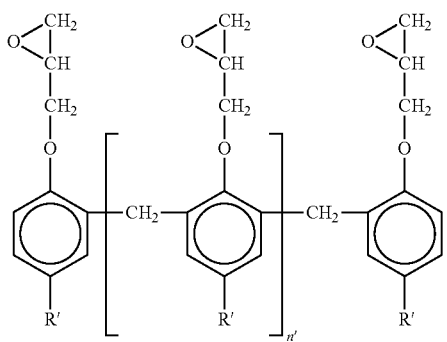

wherein R'=H or

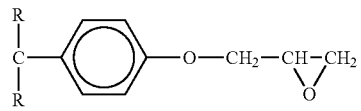

wherein R=H or CH₃, and n'=0-4.

23. The composition according to claim 22, wherein R is CH₃ and n' is 0.1-2.

24. The composition according to claim 9, wherein the at least one reactive diluent has a viscosity, measured at 25° C., less than or equal to 1000 mPa·s.

25. The composition according to claim 9, wherein the at least one reactive diluent represents at least 10% by weight of the resin composition and does not exceed 70%.

26. The composition according to claim 9, further comprising at least one crosslinking agent selected from the group consisting of a compound with an amine functional group, a compound with a hydroxyl functional group, a compound with an aldehyde functional group, a compound with a carboxylic functional group, and a heterocyclic compound with a nitrogen and oxygen separated by a carbon.

27. The composition according to claim 26, wherein the least one crosslinking agent is selected from the group consisting of an aliphatic amine, polyamidoamine, an aromatic amine, tris(hydroxymethyl)nitromethane, a resin comprising a condensate obtained by a Mannich reaction of a phenolic compound, an aldehyde and an amino alcohol, glyoxal, a glyoxal derivative, 2,2-dimethoxyethanal, an acrylic acid homopolymer, an acrylic acid copolymer, 1,3-phenylenebisoxazoline, 3-ethyl-2-methyl-2-(3-methylbutyl)-1,3-oxazolidine and 1-aza-3,7-dioxa(5-ethyl)bicyclo[3.3.0]octane.

28. The composition according to claim 26, wherein the at least one crosslinking agent is present in an amount that does not exceed 50% of the weight of the composition.

29. The composition according to claim 28, wherein the at least one crosslinking agent is present in an amount that does not exceed 30% of the weight of the composition.

30. The composition according to claim 26, wherein the at least one crosslinking catalyst is present in the liquid resin composition in an amount of is less than or equal to 10 parts by weight per 100 parts by weight of epoxy resin, reactive diluent and, the at least one crosslinking catalyst.

31. The composition according to claim 30, wherein the at least one crosslinking catalyst is present in an amount of less than or equal to 5 parts by weight per 100 parts by weight of epoxy resin, reactive diluent and crosslinking catalyst.

32. The composition according to claim 9, wherein the at least one resin comprising at least two epoxy groups represents at least 50% by weight of the composition and does not exceed 90%.

33. The composition according to claim 32, wherein the at least one reactive diluent does not exceed 30% of the weight of the composition.

34. The composition according to claim 9, wherein the at least one reactive diluent represents at least 10% by weight of the composition and does not exceed 70%.

35. The composition according to claim 34, wherein the at least one reactive diluent represents at least 20% by weight of the resin composition and does not exceed 70%.

* * * * *